United States Patent
Perssonet al.

(10) Patent No.: US 11,993,305 B2
(45) Date of Patent: May 28, 2024

(54) SYSTEM AND METHOD FOR ESTIMATING AN ARTICULATION ANGLE OF AN ARTICULATED VEHICLE COMBINATION

(71) Applicant: VOLVO TRUCK CORPORATION, Gothenburg (SE)

(72) Inventors: Daniel Persson, Gothenburg (SE); Hans Deragården, Kullavik (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 365 days.

(21) Appl. No.: 17/643,060

(22) Filed: Dec. 7, 2021

(65) Prior Publication Data

US 2022/0185371 A1    Jun. 16, 2022

(30) Foreign Application Priority Data

Dec. 10, 2020  (EP) .................................. 20213079

(51) Int. Cl.
*B62D 15/02*   (2006.01)
*B60R 11/04*   (2006.01)
(Continued)

(52) U.S. Cl.
CPC ............ *B62D 15/023* (2013.01); *B60R 11/04* (2013.01); *B62D 12/00* (2013.01); *G06T 7/60* (2013.01);
(Continued)

(58) Field of Classification Search
CPC ....... B62D 15/023; B62D 12/00; B60R 11/04; B60R 2300/105; B60R 2300/30; B60R 2300/80; G06T 7/60; G06T 2207/30252
(Continued)

(56) References Cited

U.S. PATENT DOCUMENTS 11,851,061 B2 * 12/2023 Niewiadomski .............................
                                                      B60W 30/18009
2005/0055138 A1 * 3/2005 Lee .......................... B60D 1/62
                                                             701/1
(Continued)

FOREIGN PATENT DOCUMENTS

GB             2582323 A  *  9/2020 ............... B60R 1/00
WO       2019202317 A1     10/2019
WO      WO-2020177970 A1 *  9/2020 ............... B60R 1/00

OTHER PUBLICATIONS

Liang et al., "Estimation of Articulation Angle for Tractor Semi-trailer Based on State Observer," 2010, Publisher: IEEE.*

(Continued)

*Primary Examiner* — Tuan C To
(74) *Attorney, Agent, or Firm* — Venable LLP; Jeffri A. Kaminski

(57) ABSTRACT

A system for estimating an articulation angle between a first and a second connected vehicle section of an articulated vehicle combination, the system comprising a primary image obtaining device configured to be mounted on a first position of one of the vehicle sections and to obtain images of the other vehicle section during use; a secondary image obtaining device configured to be mounted on a second position of one of the vehicle sections and to obtain images of the other vehicle section during use, the second position being different from the first position, and/or a mounting orientation at the second position of the second image obtaining device being different from a mounting orientation at the first position of the primary image obtaining device.

15 Claims, 3 Drawing Sheets

(51) Int. Cl.
B62D 12/00 (2006.01)
G06T 7/60 (2017.01)

(52) U.S. Cl.
CPC ..... *B60R 2300/105* (2013.01); *B60R 2300/30* (2013.01); *B60R 2300/80* (2013.01); *G06T 2207/30252* (2013.01)

(58) Field of Classification Search
USPC .......................................................... 701/34.4
See application file for complete search history.

(56) References Cited

U.S. PATENT DOCUMENTS

| | | | | |
|---|---|---|---|---|
| 2014/0309887 | A1* | 10/2014 | Lavoie | B60W 50/14 701/41 |
| 2014/0309888 | A1* | 10/2014 | Smit | B60W 30/045 701/41 |
| 2015/0344067 | A1* | 12/2015 | Lavoie | B62D 13/06 701/41 |
| 2016/0049020 | A1 | 2/2016 | Kuehnle et al. | |
| 2018/0319438 | A1 | 11/2018 | Herzog | |
| 2020/0019182 | A1* | 1/2020 | Ling | B60D 1/06 |
| 2020/0094743 | A1* | 3/2020 | Carpenter | B60R 1/003 |
| 2020/0324763 | A1* | 10/2020 | Switkes | G08G 1/161 |
| 2021/0179172 | A1* | 6/2021 | Kroeze | G05D 1/0246 |
| 2021/0403032 | A1* | 12/2021 | Jing | H04W 4/026 |
| 2022/0144028 | A1* | 5/2022 | Saini | B60D 1/62 |
| 2023/0322032 | A1* | 10/2023 | Plowman | B60D 1/245 340/431 |
| 2023/0359218 | A1* | 11/2023 | Puura | G06T 7/85 |

OTHER PUBLICATIONS

European Search Report dated May 17, 2021 in corresponding European Patent Application No. 20213079.5, 8 pages.

* cited by examiner

SYSTEM AND METHOD FOR ESTIMATING AN ARTICULATION ANGLE OF AN ARTICULATED VEHICLE COMBINATION

TECHNICAL FIELD

The invention relates to a system for estimating an articulation angle between a first and a second connected vehicle section of an articulated vehicle combination. The invention also relates to a method for an articulated vehicle combination for estimating an articulation angle between a first and a second connected vehicle section of the articulated vehicle combination. The invention further relates to a vehicle, an articulated vehicle combination and to a control unit.

The invention can be applied in heavy-duty vehicles, such as trucks, buses and construction equipment. Although the invention will be described with respect to a heavy-duty truck and trailer combination, the invention is not restricted to this particular vehicle and vehicle combination, but may also be used in other vehicles such as dumpers, wheel loaders, excavators and passenger cars.

BACKGROUND

In recent years technologies have been developed for estimating an articulation angle of an articulated vehicle combination, in particular for truck and trailer combinations. For example, it is known to provide cameras which recognize a relative angle, i.e. an articulation angle between a towing truck and a connected trailer.

For example, WO19202317 A1 discloses a system for measuring an articulation angle between a vehicle and a trailer by use of a vehicle mounted camera.

Even though it is known to estimate an articulation angle of an articulated vehicle combination by use of a camera, it is still a strive to further improve the articulation angle estimation. In particular, it has been realized that it is important to provide a more reliable and robust articulation angle estimation since this is a very important input to certain vehicle systems, such as reverse assistance vehicle systems.

SUMMARY

In view of the above, an object of the invention is to provide a more reliable and robust system for estimating an articulation angle between a first and a second connected vehicle section of an articulated vehicle combination. Another object of the invention is to provide a more reliable and robust method for an articulated vehicle combination for estimating an articulation angle between a first and a second connected vehicle section of the articulated vehicle combination. Yet further objects of the invention are to provide an improved vehicle, an improved articulated vehicle combination, and a control unit, which provides more reliable and robust articulation angle estimation.

According to a first aspect of the invention, the object is achieved by a system according to claim 1. Accordingly, the object is achieved by a system for estimating an articulation angle between a first and a second connected vehicle section of an articulated vehicle combination, the system comprising:

a primary image obtaining device configured to be mounted on a first position of one of the vehicle sections and to obtain images of the other vehicle section during use;

a secondary image obtaining device configured to be mounted on a second position of one of the vehicle sections and to obtain images of the other vehicle section during use, the second position being different from the first position, and/or a mounting orientation at the second position of the secondary image obtaining device being different from a mounting orientation at the first position of the primary image obtaining device; and wherein the system is configured to:

estimate the articulation angle by use of at least one obtained image from the primary image obtaining device;

determine if an unreliability condition has been fulfilled which indicates that the articulation angle cannot be reliably estimated from the at least one obtained image from the primary image obtaining device; and when the unreliability condition has been fulfilled, the system is further configured to:

estimate the articulation angle by use of at least one obtained image from the secondary image obtaining device.

A vehicle section as used herein means a vehicle or vehicle body comprising ground engaging means, typically wheels, which is connectable or permanently connected to another vehicle or vehicle body. For example, a truck and a trailer are considered to be two connectable vehicle sections together forming an articulated vehicle combination. However, a front and rear vehicle body which are permanently connected, such as vehicle bodies of a dumper, may also be considered as vehicle sections of an articulated vehicle combination.

An image obtaining device as used herein means a device which is capable of obtaining an image. Such a device is typically a camera, e.g. an optical camera. However, an image obtaining device may also use other technology, such as laser, radio waves, sound waves etc. for obtaining an image. Accordingly, the image obtaining devices as mentioned herein may be any type of image obtaining device, such as a camera, LIDAR (Light Detection And Ranging), a RADAR (RAdio Detection And Ranging), a SONAR (SOund Navigation And Ranging) or the like.

The position of the primary and the secondary image obtaining devices may be seen in a three-dimensional space, which is e.g. defined by three orthogonal axes, such as axes of a Cartesian coordinate system. In a similar manner, the orientation may be an orientation, or angular position, with respect to any one or all of the three orthogonal axes. Accordingly, according to an embodiment, the primary and the secondary image obtaining devices may be substantially positioned at the same mounting position but oriented differently.

By the provision of the system as disclosed herein, a more reliable and robust articulation angle estimation can be obtained. In particular, it has been realized that in certain conditions an image obtaining device may not provide an image which is clear/good enough to reliably estimate the articulation angle. Therefore, by using a secondary image obtaining device for estimating the articulation angle when the above mentioned unreliability condition has been fulfilled, a more reliable value of the articulation angle can be obtained. In other words, the system may be configured to switch from using the primary image obtaining device to instead, or additionally, using the secondary image obtaining device for the articulation angle estimation when the unreliability condition has been fulfilled. In addition, this has shown to also result in a more robust articulation angle estimation. For example, a value of the articulation angle may be provided even if the articulation angle in some situations cannot be reliably estimated by the primary image obtaining device. Further, by providing the secondary image obtaining device at a position which is different from the mounting position of the primary image obtaining device, any unreliability which is a consequence of the current position of the primary image obtaining device can be avoided by the secondary image obtaining device. In a similar manner, by orienting the secondary image obtaining device differently from the orientation of the primary image obtaining device, any unreliability which is a consequence of the current orientation of the primary image obtaining device can be avoided by the secondary image obtaining device.

Optionally, the primary image obtaining device is an optical image obtaining device, such as a camera or a LIDAR, wherein the unreliability condition is a condition considered fulfilled when a light intensity in the obtained images of the primary image obtaining device is outside a predetermined light intensity range. It has been realized that in some situations, e.g. during strong light conditions, the primary image obtaining device may not be able to provide an image with sufficient quality for reliably estimating the articulation angle. As such, if this is the case, the secondary image obtaining device may instead, or in addition, obtain an image which then is used for estimating the articulation angle. Thereby a more reliable estimation can be obtained. Purely by way of example, the light intensity may be indicative of light emitted per unit area which is received by the primary image obtaining device. Light intensity may for example be expressed as candela per square meter ($cd/m^2$). High or strong light intensity as used herein may also be defined as glare, typically sun glare.

Still optionally, the predetermined light intensity range may be defined by at least one of:
- an upper limit associated with a too high light intensity, such as caused by direct or reflected sunlight and light from headlamps at night;
- a lower limit associated with a too low light intensity, such as dark/night conditions and dirt and/or water splash on the primary image obtaining device.

Optionally, the articulation angle may be estimated by determining a relative position and/or orientation of the first and second vehicle sections from the at least one obtained image.

Optionally, when the unreliability condition is fulfilled, the articulation angle may be estimated by determining an articulation angle change by use of the secondary image obtaining device and by using an absolute articulation angle estimated at least by use of the primary image obtaining device before the unreliability condition was fulfilled. For example, it has been realized that the secondary image obtaining device may be positioned at a position which is less suitable for reliably estimating an absolute articulation angle. Therefore, the articulation angle may still be reliably estimated if only an articulation angle change can be estimated from the secondary image obtaining device. For example, by adding this angular change to the absolute articulation angle estimated by use of the primary image obtaining device before the unreliability condition was fulfilled, a reliable value of the articulation angle can be estimated. According to an example embodiment, the system may be configured to determine a confidence level of the articulation angle estimation by use of the obtained image from the secondary image obtaining device, e.g. a confidence level of the determined articulation angle and/or of the determined articulation angle change. For example, when the confidence level is indicative of an unreliable absolute articulation angle estimation by use of the obtained image from the secondary image obtaining device, the system may be configured to instead estimate the articulation angle by determining the articulation angle change by use of the secondary image obtaining device.

Optionally, the articulation angle may also be estimated by dead-reckoning if not any one of the primary and the secondary image obtaining devices are capable of providing a reliable estimation of the articulation angle. Accordingly, the articulation angle may be estimated by extrapolating from a previously estimated or known value of the articulation angle and/or of the articulation angle change.

Optionally, when the unreliability condition is fulfilled, the articulation angle may be estimated by a weighted value based on estimated articulation angles by use of at least one respective obtained image from the primary and the secondary image obtaining devices. For example, the weighted value may be weighted by use of a weight factor. The weight factor may be variable in dependence on a determined confidence level of the respective articulation angle estimation by use of the primary and the secondary image obtaining devices.

Optionally, the secondary image obtaining device may be calibrated by use of the at least one obtained image from the primary image obtaining device. For example, the secondary image obtaining device may primarily be used for other purposes, and therefore it may need to be calibrated before it is used for estimating the articulation angle. Purely by way of example, the secondary image obtaining device may be a rear-view mirror camera which primary purpose is to provide a rear-view image of a side of the vehicle for a driver, and not to estimate the articulation angle.

Optionally, the secondary image obtaining device is any one of a camera, a LIDAR, a RADAR, an ultrasonic sensor and a SONAR.

Optionally, when the unreliability condition is not fulfilled, the articulation angle may be estimated by use of the primary and the secondary image obtaining devices. It has namely been found that the articulation angle may be better estimated by both devices also during a normal condition when the image data from the primary image obtaining device is still reliable. In other words, use of the secondary image obtaining device also during normal conditions may further improve the reliability of the articulation angle estimation.

According to a second aspect of the invention, the object is achieved by a vehicle comprising at least parts of the system according to any one of the embodiments of the first aspect of the invention, wherein at least the primary image obtaining device is preferably mounted on the vehicle.

Advantages and effects of the second aspect of the invention are largely analogous to the advantages and effects of the first aspect of the invention. Further, all embodiments of the second aspect of the invention are combinable with all embodiments of the first aspect of the invention and vice versa, unless explicitly stated otherwise.

The vehicle may for example be a truck, such as a towing truck for towing one or more trailers. The system and/or the vehicle typically includes a control unit, i.e. an electronic control unit, which is configured to estimate the articulation angle according to the embodiments of the first aspect of the invention.

Optionally, the primary image obtaining device may be mounted at a rearward facing side of the vehicle, such as on a rear side of a vehicle cabin or on a rearward facing side of a vehicle chassis, such as behind and/or below a vehicle coupling point. It has for example been realized that it may be especially advantageous to mount the primary image obtaining device behind and/or below the vehicle coupling point, since this may provide a better image of the other vehicle section and its movement with respect to the vehicle comprising the primary image obtaining device.

Optionally, the second position may be any one of a position on a lateral side of the vehicle and on the rearward facing side of the vehicle.

According to a third aspect of the invention, the object is achieved by an articulated vehicle combination comprising a first and a second vehicle section, wherein the first vehicle section is the vehicle according to any one of the embodiments of the second aspect.

Advantages and effects of the third aspect of the invention are largely analogous to the advantages and effects of the first and second aspects of the invention. Further, all embodiments of the third aspect of the invention are combinable with all embodiments of the first and second aspects of the invention and vice versa, unless explicitly stated otherwise.

The second vehicle section of the articulated vehicle combination is typically a connectable vehicle trailer which is connectable to the vehicle via the vehicle coupling point as mentioned in the above.

The articulated vehicle combination may be any kind of combination, including but not limited to different kinds of truck vehicle combinations, comprising one or more trailers, dolly units etc. As such, according to an example embodiment, the second vehicle section may be a dolly unit which connects the vehicle to a trailer. For example, such vehicle combination may be a so called Nordic combination.

Optionally, in the case when the primary image obtaining device is mounted on the vehicle, i.e. the first vehicle section, the secondary image obtaining device may be mounted on the second vehicle section. As such, the primary image obtaining device is mounted on a first position of the vehicle and is configured to obtain images of the second vehicle section during use. Further, the secondary image obtaining device is mounted on a second position of the second vehicle section and is configured to obtain images of the vehicle, i.e. the first vehicle section, during use.

According to a fourth aspect of the invention, the object is achieved by a method for an articulated vehicle combination for estimating an articulation angle between a first and a second connected vehicle section of the articulated vehicle combination, wherein the articulated vehicle combination comprises:

a primary image obtaining device mounted on a first position of one of the vehicle sections;

a secondary image obtaining device mounted on a second position of one of the vehicle sections, the second position being different from the first position, and/or a mounting orientation at the second position of the secondary image obtaining device being different from a mounting orientation at the first position of the primary image obtaining device; wherein the method comprises:

obtaining at least one image of the other vehicle section by the primary image obtaining device;

estimating the articulation angle by use of the at least one obtained image from the primary image obtaining device;

determining if an unreliability condition has been fulfilled which indicates that the articulation angle cannot be reliably estimated from the at least one obtained image from the primary image obtaining device; and when the unreliability condition has been fulfilled, the method further comprises:

obtaining at least one image of the other vehicle section by the secondary image obtaining device; and estimating the articulation angle by use of the at least one obtained image from the secondary image obtaining device.

Advantages and effects of the fourth aspect of the invention are largely analogous to the advantages and effects of the first, second and third aspects of the invention. Further, all embodiments of the fourth aspect of the invention are combinable with all embodiments of the first, second and third aspects of the invention and vice versa, unless explicitly stated otherwise.

Optionally, the method may further comprise estimating the articulation angle by determining a relative position and/or orientation of the first and second vehicle sections from the at least one obtained image.

Optionally, when the unreliability condition is fulfilled, the method may further comprise:

estimating the articulation angle by determining an articulation angle change by use of the secondary image obtaining device and by using an absolute articulation angle estimated at least by use of the primary image obtaining device before the unreliability condition was fulfilled.

Optionally, the method may further comprise:

calibrating the secondary image obtaining device by use of the at least one obtained image from the primary image obtaining device.

Optionally, when the unreliability condition is not fulfilled, the method may further comprise:

estimating the articulation angle by use of the primary and the secondary image obtaining devices.

According to a fifth aspect of the invention, the object is achieved by a control unit for an articulated vehicle combination for estimating an articulation angle between a first and a second connected vehicle section of the articulated vehicle combination, wherein the control unit is configured to perform the method of any one of the embodiments of the fourth aspect of the invention.

According to a sixth aspect of the present invention, the object is achieved by a computer program comprising program code means for performing the method of any one of the embodiments of the fourth aspect when said computer program is run on a computer. Effects and features of the sixth aspect of the invention are largely analogous to those described above in connection with the first and fourth aspects.

According to a seventh aspect of the present invention, the object is achieved by a computer-readable medium carrying a computer program comprising program means for performing the method of any of the embodiments of the fourth aspect when said program means is run on a computer. Effects and features of the seventh aspect of the invention are largely analogous to those described above in connection with the first and fourth aspects.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1A:
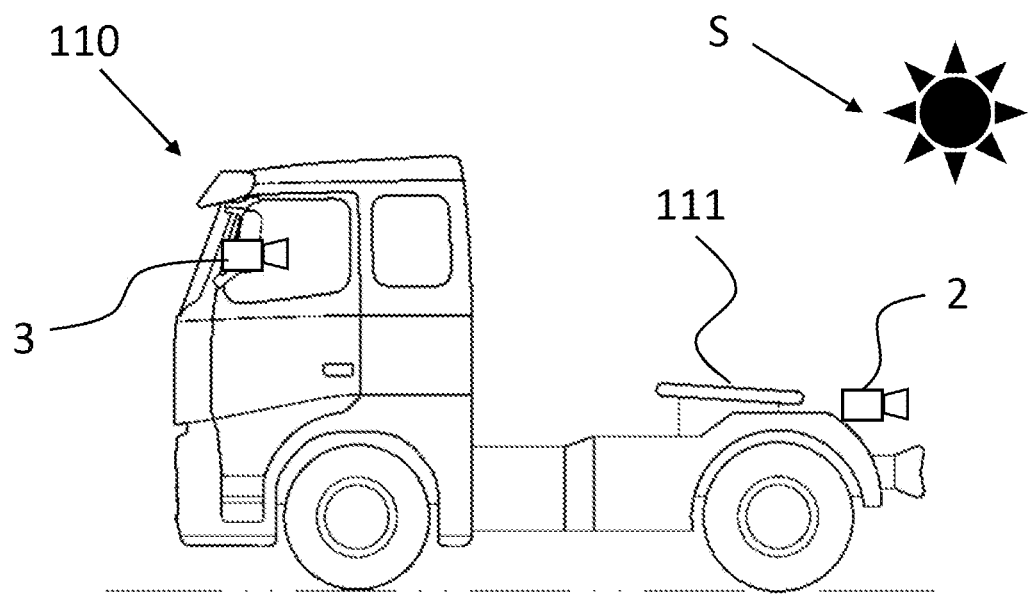
FIG. 1a is a side view of a vehicle according to an example embodiment of the present 35 invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

In FIG. 1a, a schematic side view of a vehicle 110 according to an example embodiment of the present invention is shown. The vehicle 110 is here a heavy-duty truck, and more particularly a towing truck for towing one or more trailers (not shown). It shall however be noted that the present invention is not only limited to this type of vehicle, but may also be applicable to other types of vehicles as for example mentioned in the above. The vehicle 110 comprises a vehicle coupling point 111, which is here in the form of a so called fifth wheel. The vehicle coupling point 111 is configured to couple the vehicle 110 to e.g. the aforementioned one or more trailers. Accordingly, the vehicle 110 may be regarded as a first vehicle section as defined herein and a trailer which can be connected to the first vehicle section may be regarded as a second vehicle section as defined herein.

In the shown embodiment, the vehicle 110 comprises a primary image obtaining device 2 which is mounted on a first position thereon and which is configured to obtain images of the non-shown trailer during use. It further comprises a secondary image obtaining device 3 which is mounted on a second position of the vehicle 110 and which is configured to obtain images of the non-shown trailer during use. The second position is different from the first position. More specifically, in the shown embodiment, the primary image obtaining device 2 is mounted at a rearward facing side of the vehicle 110, which here is a rearward facing side of a vehicle chassis, behind and below the vehicle coupling point 111. Furthermore, the second position is a position at a side of the vehicle 110, and the secondary image obtaining device 3 is here primarily intended to function as a rear-view mirror camera for a driver of the vehicle 110. The rear-view mirror camera 3 may replace or complement a traditional rear-view mirror.

Figure 1B:
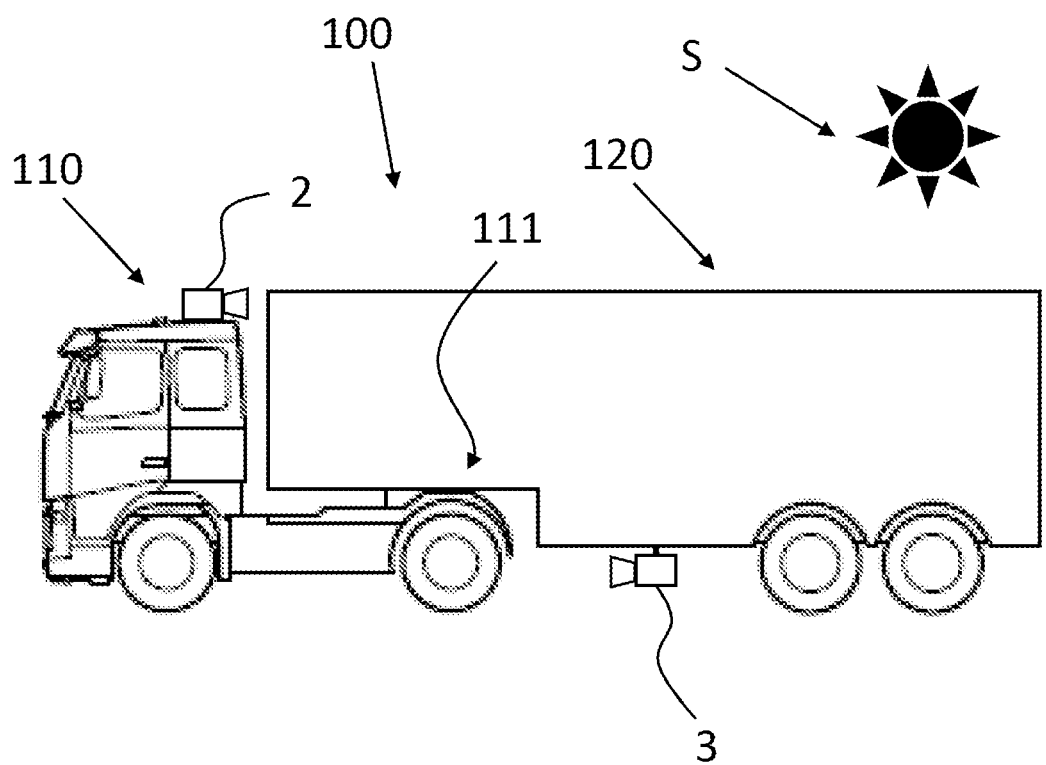
FIG. 1b is a side view of an articulated vehicle combination according to an example embodiment of the present invention.

FIG. 1b also shows a schematic side view of a vehicle 110 in the form of a towing truck. Further, the vehicle 110 is here connected to a trailer 120, i.e. the vehicle 110 is a first vehicle section and the trailer 120 is a second vehicle section. As such, the vehicle 110 and the trailer 120 forms an articulated vehicle combination 100 according to an embodiment of the present invention. The vehicle 110 comprises a primary image obtaining device 2, similar to the device shown in FIG. 1a, but with the difference that the primary image obtaining device 2 is mounted at a first position of the vehicle 110 which is a position at a top portion of a vehicle cabin of the vehicle 110. Accordingly, the primary image obtaining device 2 may be mounted at many different positions as long as it is capable of obtaining an image of the second vehicle section 120. The vehicle 110 also comprises a vehicle coupling point 111 for coupling with the trailer 120.

The trailer 120 in the shown embodiment comprises a secondary image obtaining device 3 which is positioned at a second position of the trailer 120, and which is configured to obtain images of the vehicle 110 during use. Apparently, as shown, the second position is different from the first position. More specifically, the secondary image obtaining device 3 is here mounted at a position underneath the trailer 120 and is directed towards the vehicle 110.

Figure 2:
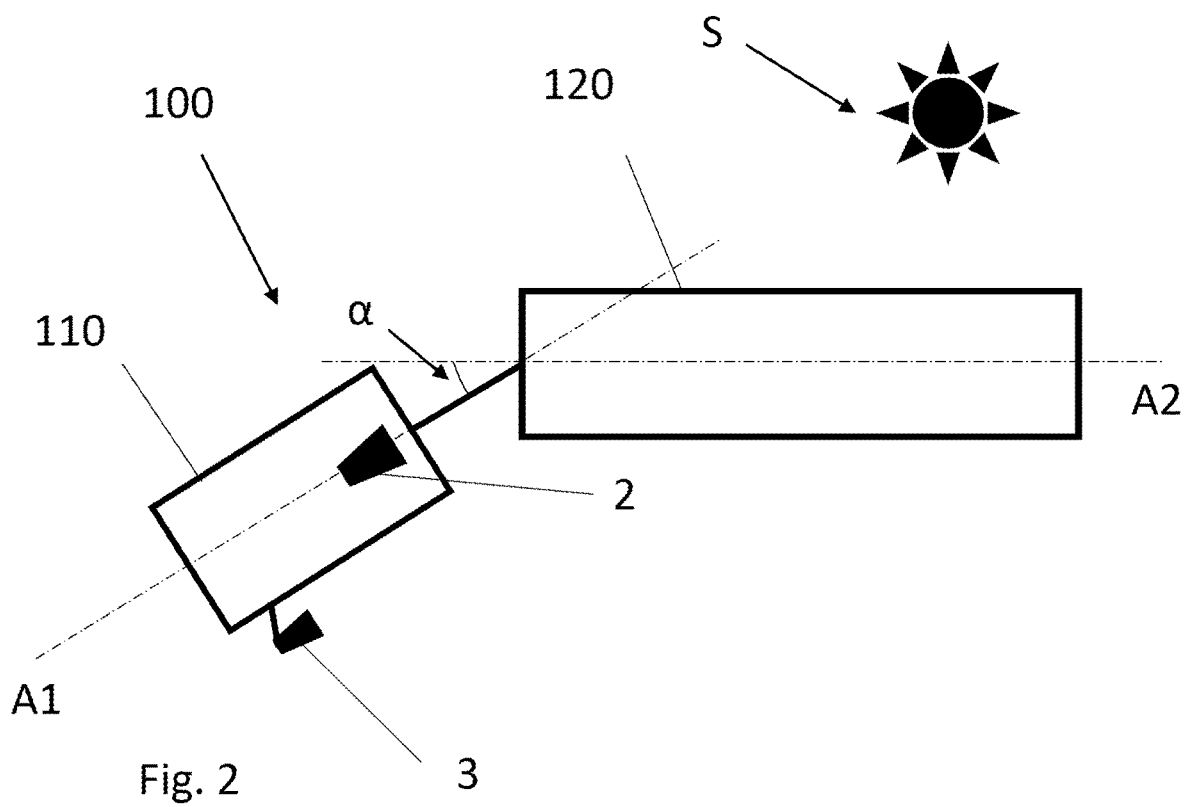
FIG. 2 is a schematic view from above of an articulated vehicle combination according to an embodiment of the present invention.

FIG. 2 shows a schematic view from above of an articulated vehicle combination 100 according to another example embodiment of the present invention. The vehicle 110 may comprise a primary image obtaining device 2 and a secondary image obtaining device 3. As shown, the mounting positions are here similar to the mounting positions depicted in FIG. 1a. The vehicle 110 is connected to a second vehicle section 120, which is here a trailer.

As can be further seen, the current pose of the vehicle 110 and the trailer 120 relative each other provides an articulation angle α therebetween.

Accordingly, an articulation angle α between a first 110 and a second 120 vehicle section may herein be defined as an angle α between longitudinal axes A1, A2 of the respective first and second vehicle sections 110, 120.

Figure 3:
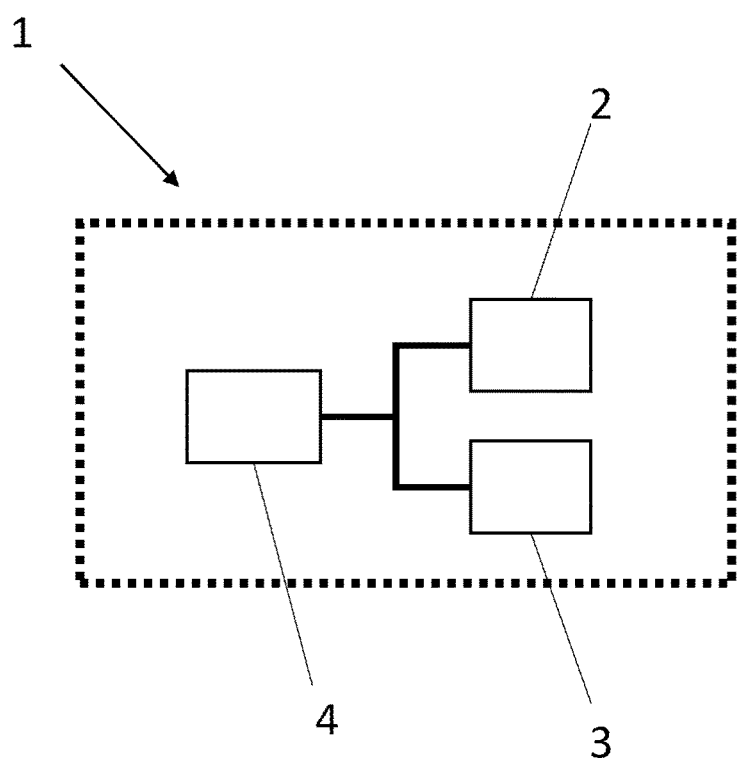
FIG. 3 is a schematic view of a system according to an example embodiment of the present invention.

Referring to FIG. 3, a schematic view of a system 1 according to an example embodiment of the present invention is depicted. The system 1 comprises a primary image obtaining device 2 and a secondary image obtaining device 3. Accordingly, the primary image obtaining device 2 may as previously shown be mounted on the vehicle 110 and the secondary image obtaining device 3 may be mounted on the vehicle 110 or on the second vehicle section 120, and further be configured as mentioned in the above.

The primary and the secondary image obtaining devices 2, 3 may be cameras, LIDAR, RADAR etc. Preferably, at least the primary image obtaining device 2 is a camera.

The system 1 may further comprise a control unit 4 which is connected to the primary and the secondary image obtaining devices 2, 3.

The control unit 4 is an electronic control unit and may comprise processing circuitry which is adapted to run a computer program as disclosed herein. The control unit 4 may comprise hardware and/or software for performing the method according to the fourth aspect of the invention. Still further, the control unit 4 is preferably provided on the vehicle 110.

The control unit 4 may be connected to the image obtaining devices 2, 3 by any one or a combination of a wired and a wireless connection. The wired and wireless connections may be any type of communicative connections for transferring data as known to the skilled person, including but not limited to a CAN-bus system, WiFi, Bluetooth, 3 g, 4 g, 5 g etc.

With respect to FIGS. 1a-3, a system 1 is disclosed for estimating an articulation angle α between a first 110 and a second 120 connected vehicle section of an articulated vehicle combination 100.

The system 1 is configured to:
estimate the articulation angle α by use of at least one obtained image from the primary image obtaining device 2;
determine if an unreliability condition has been fulfilled which indicates that the articulation angle α cannot be reliably estimated from the at least one obtained image from the primary image obtaining device 2; and
when the unreliability condition has been fulfilled, the system 1 is further configured to:
estimate the articulation angle α by use of at least one obtained image from the secondary image obtaining device 3.

It shall be noted that the primary image obtaining device 2 may obtain a series of images during use, and therefrom estimate the articulation angle α during driving of the articulated vehicle combination 100. Accordingly, the primary image obtaining device 2 may continuously, or over a time period, estimate the articulation angle α. The secondary image obtaining device 3 may in a similar manner obtain a series of images, if required to estimate the articulation angle α when e.g. the unreliability condition has been fulfilled.

The articulation angle α may for example by used during reversing of the vehicle combination 100. The reversing may be manual, i.e. performed by a driver, semi-automatic or fully automatic. During manual reversing, the articulation angle α may be used for providing guiding instructions to the driver, such as turning right or left. In semi-automatic or fully automatic reversing, the articulation angle α may be used as input to a reversing assistance system which provides steering instructions to one or more actuator(s) for steering steerable ground engaging means of the vehicle 110, typically steerable wheels.

The articulation angle α may be used as input to any other driving assistance system of the vehicle. In another embodiment, the articulation angle α may also be communicated to another system not being part of the vehicle or the vehicle combination. Accordingly, the vehicle and/or the articulated vehicle combination may further comprise a V2X (Vehicle-to-everything) communication system for communicating the articulation angle α to a remote system, such as a stationary system or a system of another vehicle.

The primary image obtaining device 2 may be an optical image obtaining device, such as a camera or a LIDAR, wherein the unreliability condition is a condition considered fulfilled when a light intensity in the obtained images of the primary image obtaining device 2 is outside a predetermined light intensity range. The predetermined light intensity range may be defined by at least one of:
an upper limit associated with a too high light intensity, such as caused by direct or reflected sunlight S and light from headlamps at night;
a lower limit associated with a too low light intensity, such as dark/night conditions and dirt and/or water splash on the primary image obtaining device 2.

As shown in FIGS. 1a-b and 2, sunlight S may, depending on the current position of the primary image obtaining device 2, affect the performance of the primary image obtaining device 2. As such, if the light intensity from the sunlight S is too high for the primary image obtaining device 2, the unreliability condition may be considered fulfilled. Thereby, the system 1 can switch from using the primary image obtaining device 2 for the articulation angle estimation a, and instead, or additionally, use the secondary image obtaining device 3. Thereby the reliability and robustness of the articulation angle estimation can be increased and improved.

Still further, the primary image obtaining device 2 as shown in e.g. FIG. 1a may due to its position be negatively affected by e.g. dirt and/or water splash, resulting in a too low light intensity. Therefore, the secondary image obtaining device 3 may be advantageously used also in such situations when the unreliability condition has been fulfilled.

In a further embodiment, any one of the primary and the secondary image obtaining devices 2, 3, may be complemented with a light emitting source for improving the visibility. Especially, the image obtaining device 2 in FIG. 1a and the image obtaining device 3 in FIG. 1b may advantageously be complemented with the light emitting source, which is directed in the same, or similar, direction as its associated image obtaining device. Thereby further improved images may be obtained, implying that the unreliability condition may be fulfilled in fewer situations.

The articulation angle α may be estimated by determining a relative position and/or orientation of the first and second vehicle sections 110, 120 from the at least one obtained image. For example, from the obtained image(s), which is/are obtained by any one or both image obtaining devices 2, 3, the control unit 4 may be configured to identify the other vehicle section, 120 or 110, and its relative position and/or orientation, or pose, with respect to the vehicle section, 110 or 120, onto which the image obtaining device (s) is/are mounted.

This may for example be performed by use of an image recognition algorithm which is configured to identify the other vehicle section 120. By use of the identification of the other vehicle section, 120 or 110, in the obtained image(s), the relative position and/or orientation may be determined. For example, the control unit 4 may further comprise a distance determining algorithm which determines a distance in the obtained image(s) to one or more reference point(s) on the other vehicle section, 120 or 110. By use of the determined distance(s) to the one or more reference point(s), the relative position and/or orientation may be determined.

When the unreliability condition is fulfilled, the articulation angle α may be estimated by determining an articulation angle change by use of the secondary image obtaining device 3 and by using an absolute articulation angle estimated at least by use of the primary image obtaining device 2 before the unreliability condition was fulfilled. For example, if the secondary image obtaining device 2 is a rear-view mirror camera it may only be capable to reliably determine a change of the articulation angle. Therefore, it has been realized that by the aforementioned configuration, a more reliable value of the articulation angle α may be obtained.

Still further, the secondary image obtaining device 3 may be calibrated by use of the at least one obtained image from the primary image obtaining device 2. For example, the aforementioned articulation angle change may be calibrated during normal conditions when the primary image obtaining device 2 is providing reliable image data for the articulation angle estimation. Thereby, a further improved value of the articulation angle change may be obtained.

In order to further improve the articulation angle estimation, the articulation angle α may be estimated by use of the primary 3 and the secondary 2 image obtaining devices when the unreliability condition is not fulfilled.

Even though the above embodiments have shown a primary and a secondary image obtaining device 2, 3, it shall be noted that the system 1 could also comprise more than two image obtaining devices in order to further improve the estimation of the articulation angle α. For example, the system 1 may comprise a primary image obtaining device 2 and a first secondary image obtaining device 3 and a second secondary image obtaining device (not shown), wherein at least one of the first secondary 3 and the second secondary image obtaining devices are used for estimating the articulation angle α when the unreliability condition is fulfilled. Purely by way of example, the first secondary image obtaining device 3 may be a rear-view mirror camera on one side of the vehicle 110, as shown in FIG. 1*a*, and the second secondary image obtaining device may be another rear-view mirror camera (not shown) provided on the other side if the vehicle 110. Thereby, the system 1 may for example be able to choose to use any one or both of the secondary image obtaining devices when the unreliability condition is fulfilled. For example, one of the secondary image obtaining devices may be negatively affected by the sunlight S whilst the other one is in a better position to obtain a reliable image which can be used for estimating the articulation angle. Thereby, a further increased reliability and improved robustness of the articulation angle estimation may be provided, by selectively choosing which one of the secondary image obtaining devices should be used for the articulation angle estimation.

Figure 4:
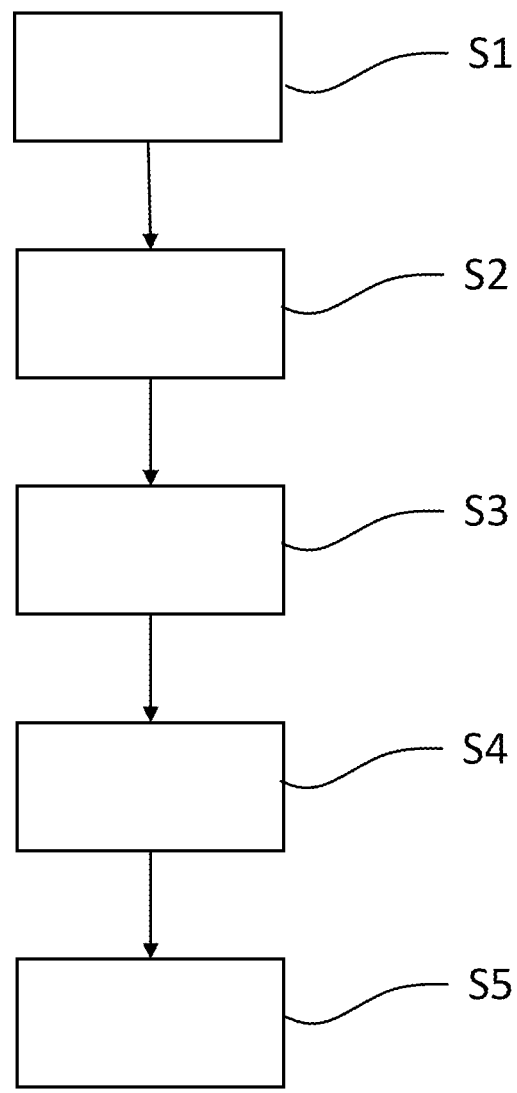
FIG. 4 is a flowchart of a method according to an example embodiment of the present invention.

FIG. 4 shows a flowchart of an example embodiment of the method as disclosed herein.

The method comprises:

S1: obtaining at least one image of the other vehicle section 120 by the primary image obtaining device 2;

S2: estimating the articulation angle α by use of the at least one obtained image from the primary image obtaining device 2;

S3: determining if an unreliability condition has been fulfilled which indicates that the articulation angle α cannot be reliably estimated from the at least one obtained image from the primary image obtaining device 2; and when the unreliability condition has been fulfilled, the method further comprises:

S4: obtaining at least one image of the other vehicle section 120 by the secondary image obtaining device 3; and S5: estimating the articulation angle α by use of the at least one obtained image from the secondary image obtaining device 3.

The method may comprise further optional steps as for example mentioned in the above.

It is to be understood that the present invention is not limited to the embodiments described above and illustrated in the drawings; rather, the skilled person will recognize that many changes and modifications may be made within the scope of the appended claims.

The invention claimed is:

1. A system for estimating an articulation angle between a first and a second connected vehicle section of an articulated vehicle combination, the system comprising:
a primary image obtaining device configured to be mounted on a first position of one of the vehicle sections and to obtain images of the other vehicle section during use;
a secondary image obtaining device configured to be mounted on a second position of one of the vehicle sections and to obtain images of the other vehicle section during use, the second position being different from the first position, and/or a mounting orientation at the second position of the secondary image obtaining device being different from a mounting orientation at the first position of the primary image obtaining device; and wherein the system is configured to:
estimate the articulation angle by use of at least one obtained image from the primary image obtaining device;
determine if an unreliability condition has been fulfilled which indicates that the articulation angle cannot be reliably estimated from the at least one obtained image from the primary image obtaining device; and
when the unreliability condition has been fulfilled, the system is further configured to:
estimate the articulation angle by use of at least one obtained image from the secondary image obtaining device.

2. The system according to claim 1, wherein the primary image obtaining device is an optical image obtaining device, such as a camera or a LIDAR, wherein the unreliability condition is a condition considered fulfilled when a light intensity in the obtained images of the primary image obtaining device is outside a predetermined light intensity range.

3. The system according to claim 2, wherein the predetermined light intensity range is defined by at least one of:
an upper limit associated with a too high light intensity, such as caused by direct or reflected sunlight and light from headlamps at night;
a lower limit associated with a too low light intensity, such as dark/night conditions and dirt and/or water splash on the primary image obtaining device.

4. The system according to claim 1, wherein the articulation angle is estimated by determining a relative position and/or orientation of the first and second vehicle sections from the at least one obtained image.

5. The system according to claim 1, wherein, when the unreliability condition is fulfilled, the articulation angle is estimated by determining an articulation angle change by use of the secondary image obtaining device and by using an absolute articulation angle estimated at least by use of the primary image obtaining device before the unreliability condition was fulfilled.

6. The system according to claim 5, wherein the secondary image obtaining device is calibrated by use of the at least one obtained image from the primary image obtaining device.

7. The system according to claim 1, wherein the secondary image obtaining device is any one of a camera, a LIDAR, a RADAR, an ultrasonic sensor and a SONAR.

8. The system according to claim 1, wherein, when the unreliability condition is not fulfilled, the articulation angle is estimated by use of the primary and the secondary image obtaining devices.

9. A vehicle comprising at least parts of the system according to claim 1, wherein at least the primary image obtaining device is preferably mounted on the vehicle.

10. The vehicle according to claim 9, wherein the primary image obtaining device is mounted at a rearward facing side of the vehicle, such as on a rear side of a vehicle cabin or on a rearward facing side of a vehicle chassis, such as behind and/or below a vehicle coupling point.

11. The vehicle according to claim 9, wherein the second position is any one of a position on a lateral side of the vehicle and on the rearward facing side of the vehicle.

12. An articulated vehicle combination comprising a first and a second vehicle section, wherein the first vehicle section is the vehicle according to claim 9.

13. The articulated vehicle combination according to claim 12, wherein the secondary image obtaining device is mounted on the second vehicle section.

14. A method for an articulated vehicle combination for estimating an articulation angle between a first and a second connected vehicle section of the articulated vehicle combination, wherein the articulated vehicle combination comprises:
- a primary image obtaining device mounted on a first position of one of the vehicle sections;
- a secondary image obtaining device mounted on a second position of one of the vehicle sections, the second position being different from the first position, and/or a mounting orientation at the second position of the secondary image obtaining device being different from a mounting orientation at the first position of the primary image obtaining device;
- wherein the method comprises:
- obtaining at least one image of the other vehicle section by the primary image obtaining device;
- estimating the articulation angle by use of the at least one obtained image from the primary image obtaining device;
- determining if an unreliability condition has been fulfilled which indicates that the articulation angle cannot be reliably estimated from the at least one obtained image from the primary image obtaining device; and
- when the unreliability condition has been fulfilled, the method further comprises:
- obtaining at least one image of the other vehicle section by the secondary image obtaining device; and
- estimating the articulation angle by use of the at least one obtained image from the secondary image obtaining device.

15. A control unit for an articulated vehicle combination for estimating an articulation angle between a first and a second connected vehicle section of the articulated vehicle combination, wherein the control unit is configured to perform the method of claim 14.

* * * * *